(Model.)
R. W. E. ALDRICH.
FISHING FLOAT.
No. 270,358. Patented Jan. 9, 1883.
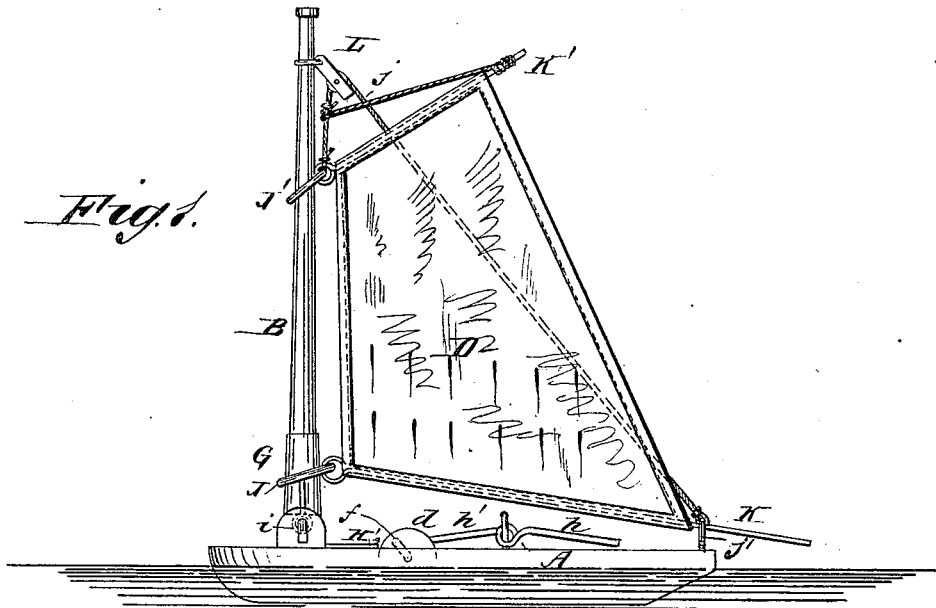
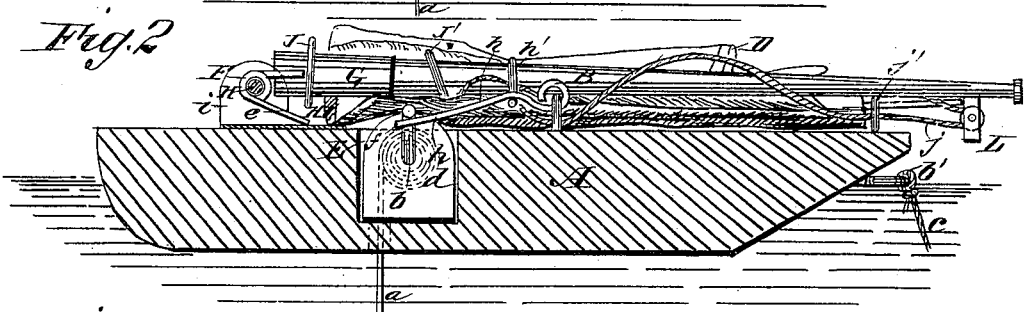
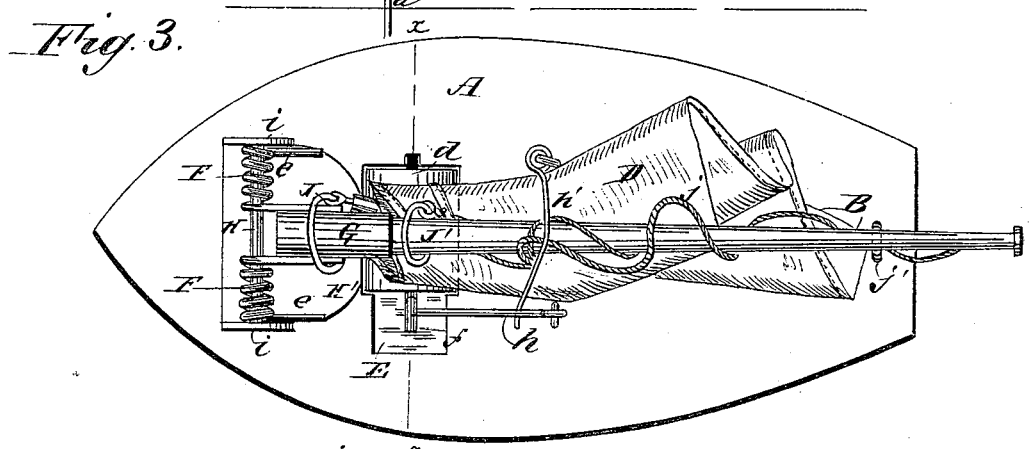
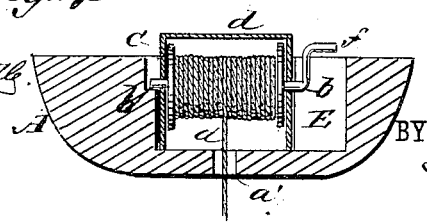
WITNESSES:
Frances McArdle
C. Sedgwick
INVENTOR:
R. W. E. Aldrich
BY Munn & Co
ATTORNEYS.

UNITED STATES PATENT OFFICE.

RALPH W. E. ALDRICH, OF NORTHAMPTON, MASSACHUSETTS.

FISHING-FLOAT.

SPECIFICATION forming part of Letters Patent No. 270,358, dated January 9, 1883.

Application filed September 18, 1882. (Model.)

*To all whom it may concern:*

Be it known that I, RALPH W. E. ALDRICH, of Northampton, in the county of Hampshire and State of Massachusetts, have invented a new and Improved Automatic Fishing-Float, of which the following is a full, clear, and exact description.

This invention seeks to provide a novel device for hook-and-line fishing; and it consists of a float, preferably in the form of a miniature boat carrying a mast, sail, fishing-reel, and line, or equivalent devices, arranged to hold the line and to automatically signal the hooking of a fish, and at the same time give play-line to the hooked fish. The mast is spring-supported on the float, and is adapted to be locked down flat upon the deck of the float for furling the sail. The mechanism for locking the mast flat on the deck of the float is at the same time adapted to lock the reel with as much line paid out as desired, according to the depth of the water and the kind of fish sought, and the reel and locking mechanism are so arranged that the jerking of a fish at the hook will release the locking mechanism and the reel, and also the mast, which will then be raised by its springs to a vertical position, unfurling the sail and giving the signal.

Reference is to be had to the accompanying drawings, forming part of this specification, in which similar letters of reference indicate corresponding parts in all the figures.

Figure 1 is a side elevation of my automatic fishing-float as it appears with the mast and sail raised to the position they automatically assume when a fish is on the hook. Fig. 2 is a longitudinal sectional elevation of the same with the mast and reel set. Fig. 3 is a plan view of the same; and Fig. 4 is a cross-sectional elevation of the float and reel housing, taken on the line *x x* of Fig. 3.

A represents the float; B, the mast; C, the reel; and D represents the sail.

The float is made of a block of wood in form of a boat, and is from a foot to a foot and a half in length, and has the recess E formed in it. In this recess is placed the sheet-metal housing *d*, in which is journaled the reel C, on which the line *a*, to which the fish-hook is attached, is wound. The shaft *b* of the reel terminates at one end in or is provided at one end with the crank *f* for winding in the line, and for setting or locking the reel and mast by means of the rods *h h'*, attached to the deck of the float, as shown in Fig. 3.

F F are the springs by which the mast B is attached to the float A. These springs are by preference soldered or otherwise made fast to the metal socket or sleeve G, in which the lower end of the mast is held, and are placed upon the rod H, which rod is held in the upright plates *i i*, which are by preference a part of the plate H', which is secured to the float. The free ends *e e* of the springs are of considerable length, and extend in rear of the rod H and rest in the plate H', as shown clearly in Fig. 2, and thus serve to hold the springs so that they will lift the mast, when released from under the rod *h'*, to a vertical position.

The sail D is attached to the mast by means of the rings J J', which are attached respectively to the boom K and gaff K', and is hoisted when the mast is lifted to vertical position, by means of the cord *j*, which is attached to the ring J' and passes through the block L, and from thence down to the stern of the float, where it is made fast in the eye *j'*, as shown clearly in Fig. 1.

*a'*, Fig. 4, is a small hole made in the keel of the float, immediately under the reel C, for the passage of the baited hook and line, as clearly indicated in said figure; and *b'* is an eye in the stern of the float for attaching to the float the anchor-line *c*.

In order to prepare the float for fishing, the hook is first to be baited, then passed through the hole *a'*, and the length of line required drawn off from the reel. The mast is then to be brought down to the deck of the float, and the rod *h'* passed at right angles over it and under the rod *h*, and this rod *h* is then to be placed under the crank *f* of the reel, which will cause the rods to hold the mast and reel, as illustrated in Figs. 2 and 3. In this condition the float is to be anchored out in the water and the hook dropped. The mast and reel will remain in this locked condition until the line *a* is disturbed sufficiently by the biting of a fish to turn the reel, whereupon the crank *f* will be moved off from the rod *h* and set the reel and mast free, thus giving play-line to the fish and signaling the biting or catching of a fish.

In most cases the fisherman will provide himself with several of the floats, and after anchoring them out in the water will retire to some convenient spot to await the hoisting of a sail, upon which he will proceed to the float, pull in the fish, and rebait the hook and reset the float, and in most cases the bottom of the floats will be painted green, so that when in the water they will resemble the leaf of some water-plant and not frighten away or excite the suspicion of the fish.

Instead of using the rods $h\ h'$ for locking the mast, other independent automatic means might be used for giving the signal, and instead of adapting the reel to give off play-line it might be made to hold the line fast, and not depart from the spirit of my invention.

Having thus described my invention, what I claim as new, and desire to secure by Letters Patent, is—

1. The combination, with the float A, of the spring-supported mast B, reel C, and means, substantially as described, for locking the mast and reel in the manner and for the purposes set forth.

2. The automatic fishing-float, made substantially as herein shown and described, consisting of the float A, spring-supported mast B, reel C, sail D, and locking-rods $h\ h'$, as and for the purposes set forth.

3. The float A, formed with the recess E and hole $a'$, in combination with the reel C, housing $d$, and line $a$, substantially as shown and described.

4. The reel C, having the handle $f$, in combination with the rods $h\ h'$ and spring-supported mast B, substantially as and for the purposes set forth.

5. The combination, with the spring-supported mast B, of the sail D, block L, and cord $j$, made fast to the float, substantially as and for the purposes set forth.

RALPH W. E. ALDRICH.

Witnesses:
FRANK EDWARDS,
WM. H. CLAPP.